US005564129A

United States Patent [19]
Ball et al.

[11] Patent Number: 5,564,129
[45] Date of Patent: Oct. 15, 1996

[54] SAFETY HELMET WITH ATTACHED CABLE AND LOCK

[76] Inventors: Larry Ball, 1013 Swarthmore Ave., Pacific Palisades, Calif. 90272; Alexander Kim, 10560 Wilshire Blvd.#806, Los Angeles, Calif. 90024; Peter Christensen, 3819 S. Topanga Canyon La., Malibu, Calif. 90265

[21] Appl. No.: 545,222

[22] Filed: Oct. 19, 1995

[51] Int. Cl.⁶ .............................. A42B 3/04; E05B 69/00
[52] U.S. Cl. .................................................. 2/422; 70/59
[58] Field of Search .............................. 2/410, 422, 425; 70/14, 18, 30, 49, 57, 58, 59

[56] References Cited

U.S. PATENT DOCUMENTS

| | | | |
|---|---|---|---|
| 3,436,936 | 4/1969 | Locker | 70/59 |
| 3,531,955 | 10/1970 | Taylor et al. | 70/59 |
| 3,581,531 | 6/1971 | Hediger | 70/59 |
| 3,798,934 | 3/1974 | Wright et al. | 70/59 |
| 3,882,700 | 5/1975 | Dunlap et al. | 70/59 |
| 4,024,738 | 5/1977 | Pi | 70/59 |
| 4,676,080 | 6/1987 | Schwartz | 70/59 |
| 4,766,616 | 8/1988 | Donahue | 2/422 |

FOREIGN PATENT DOCUMENTS 7407054  12/1975  Netherlands ............................ 2/422

*Primary Examiner*—Michael A. Neas
*Attorney, Agent, or Firm*—Lyon & Lyon

[57] ABSTRACT

An improved safety helmet with an embedded lock, and a cable, the cable having a fixed end attached to the helmet and a retractable end which may be secured by the lock. When not in use, the cable is locked and stored in the groove in the brim of the helmet. The helmet also has pegs which function to retain the cable within the groove while it is being stored.

6 Claims, 1 Drawing Sheet

SAFETY HELMET WITH ATTACHED CABLE AND LOCK

BACKGROUND OF THE INVENTION

1) Field of the Invention

This field of the present invention is safety helmets for riders of bicycles or motorcycles.

2) Background of the Related Art

Safety helmets can significantly reduce the number and severity of injuries occurring to riders of bicycles and motorcycles as a result of accidents. In recognition of the public harms which can result from severe head injuries to riders, some municipal and state governments have passed ordinances requiring safety helmets to be worn while riding a bicycle or motorcycle. However, there is often no place to store a helmet secure from theft when a rider parks the cycle at a particular destination away from home. Furthermore, it is often not practical for the rider to carry the helmet with him. Finally, there is the problem of the security of the cycle itself.

To address these problems, various helmet designs have been proposed. U.S. Pat. No. 4,766,616, issued Aug. 30, 1988 to J. Donahue, discloses a safety helmet including a locking mechanism and a shackle which may be stored on the outside of the helmet. This structure allows the helmet and cycle to be secured to a fixed object such as a post. In particular, the shackle is stored either in a hollowed-out compartment inside the helmet or in a snap-fit channel on the helmet.

However, there are shortcomings to the disclosed design. If a hollowed-out compartment is fabricated inside the helmet, this may increase the helmet's cost. Also, when the helmet is to be secured, removal of the shackle from the compartment may be somewhat awkward. Finally, the compartment may be aesthetically unappealing for the overall helmet design.

If, instead, the shackle is stored in a snap-fit channel when not in use, then, as disclosed by Donahue, the shackle is not locked or otherwise fixed to the helmet, other than by the snap-fit channel. Over time and rough riding, the snap-fit channel may loosen and/or the shackle may pop out and become lost. Moreover, when it is desired to lock the helmet with the shackle, the shackle first must be removed from the snap-fit channel, which may be somewhat awkward. Finally, the lip of the snap-fit channel may negatively affect the aerodynamic characteristics of the helmet which are important to some riders.

Consequently, it is desired to provide a locking safety helmet which provides an improved means of storing a cable while the helmet is being worn.

SUMMARY OF THE INVENTION

The present invention is directed to a safety helmet with a lock, an attached cable, and a means for storing the cable when not in use.

In one, separate, aspect of the invention, a safety helmet with a brim has a shallow groove formed into the brim. The helmet has a plurality of pegs arranged on the helmet to retain a cable in the groove on the helmet. The length of the cable is selected such that it fits snugly over the pegs and into the groove.

In a second, separate, aspect of the invention, a lock is partially embedded into a safety helmet in such a way that a cable may be secured to the helmet by the lock. One end of the cable is permanently attached to the helmet, preferably near the lock. When the cable is not in use, then a second end of the cable may be locked to secure it to helmet while the cable resides in the shallow groove on the helmet.

Accordingly, it is an object of the present invention to provide a locking safety helmet with an improved means of storing and securing a cable on the brim of the helmet when the cable is not in use.

DESCRIPTION OF THE PREFERRED EMBODIMENT

Figure 1:
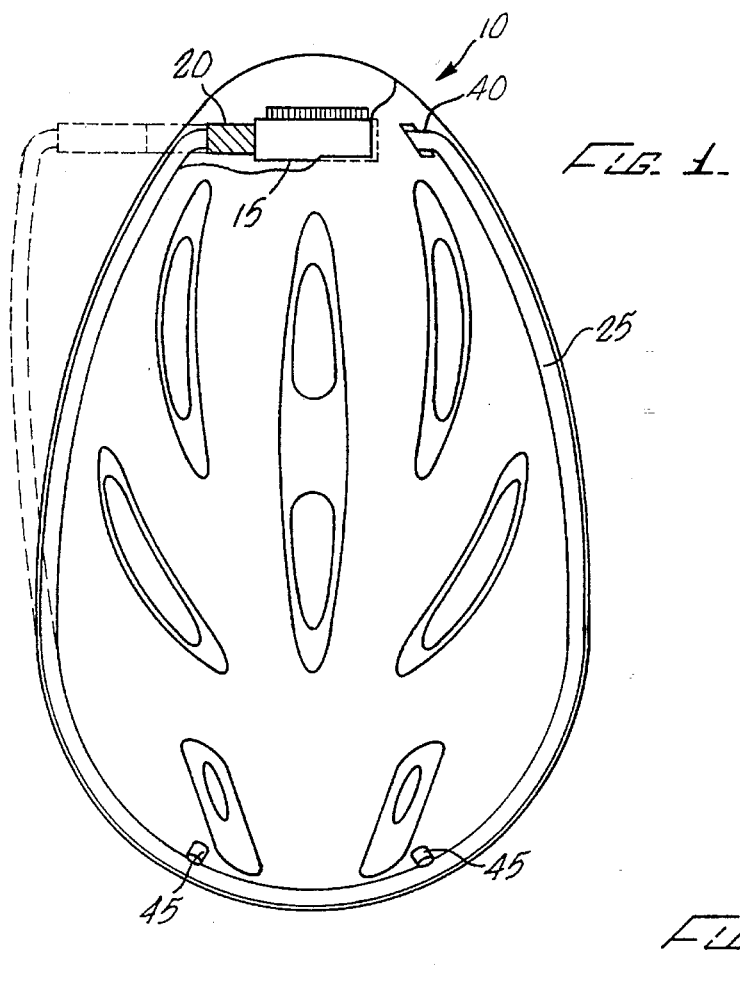
FIG. 1 is a top plan view of a locking safety helmet with a portion cut away to reveal a lock.

Turning in detail to the drawings, FIG. 1 illustrates a locking safety helmet 10 according to a preferred embodiment of the present invention. The helmet 10 has a lock 15 attached to and partially embedded within it. As can be more clearly seen from FIG. 2, a portion of the lock 15 is exposed so that the lock may be engaged and disengaged. The lock 15 is so designed that it may receive and secure a retractable end 20 of a cable 25. The lock 15 may be, for example, a combination lock or a key lock. In a preferred embodiment, the lock 15 is embedded in the front of the helmet 10.

The cable 25 may be, for example, a chain, a curved rod, or a cord of wires twisted together. The cable may be composed of metal or other suitable high-strength material. In a preferred embodiment, the retractable end 20 of the cable 25 may be fitted with a knurled bar to be grasped more securely by the lock 15. A fixed end 40 of the cable 25 is permanently attached to the safety helmet 10. In a preferred embodiment, the fixed end 40 of the cable 25 is attached to the safety helmet 10 through attachment to the lock 15.

Figure 3:
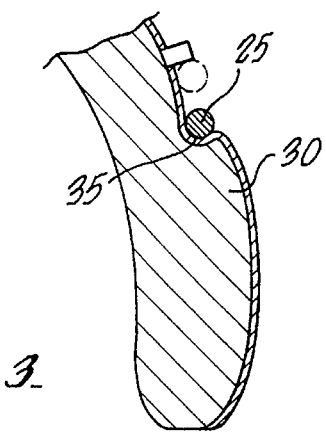
FIG. 3 is a side elevation cross section of a portion of the locking safety helmet of FIG. 1.
Figure 2:
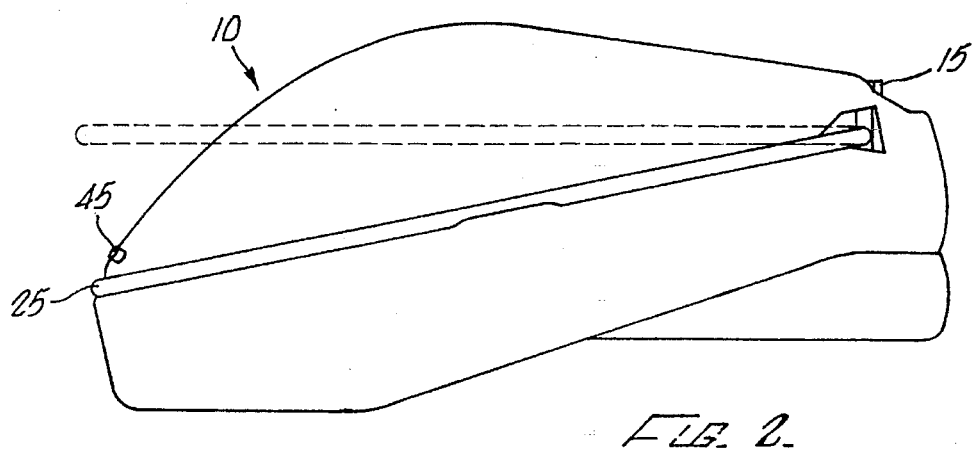
FIG. 2 is a side elevation view of the locking safety helmet of FIG. 1.

As can be seen in FIG. 3, the helmet 10 also has a brim 30, with a shallow groove 35 formed therein, for receiving the cable 25. In a preferred embodiment, a plurality of pegs 45 are arranged on the helmet just above the groove 35. The pegs 45 may comprise, for example, pins pushed into holes in the helmet or extrusions formed into the outer surface of the helmet. When the cable 25 is to be stored, the retractable end 20 is first secured to the lock 15, as shown in FIG. 1. Then, as shown in Figures 2 and 3, the cable 25 is pushed over the pegs 45 and into the shallow groove 35. The pegs 45 are so located that they urge the cable 25 toward the groove. The length of the cable 25 is selected such that, when the retractable end 20 is locked, the cable is held taut against the helmet 10 by tension.

As can be seen in FIG. 3, the shallow groove 35 does not grasp the cable 25. The cable 25 is held in place by a combination of tension from the locked retractable end 20 and the shallow groove 35. The pegs 45 may provide additional support for holding the cable 25 in place.

When it is desired to use the cable 25 to lock the helmet 10, for example, to a cycle and a fixed structure such as a bicycle post, it is easily released by simply disengaging the lock 15. The retractable end 20 of the cable 25 may then be looped around the cycle and fixed structure before it is again secured to the helmet by the lock 15.

Thus a locking safety helmet, with an improved means of storing and securing a cable on the brim of the helmet when it is not in use, is disclosed. While embodiments and applications of the present invention have been shown and described, it would be apparent to those skilled in the art that more modifications are possible without departing from the inventive concepts herein. The invention, therefore, is not to be restricted except in the spirit of the appended claims.

What is claimed is:

1. A locking safety helmet comprising:

a lock partially embedded into said helmet;

a brim having a shallow groove formed therein; and a cable having a fixed end permanently attached to said helmet, and having a retractable end capable of being secured by said lock while said cable resides within said groove.

2. A locking safety helmet comprising:

a lock partially embedded into said helmet;

a brim having a shallow groove formed therein;

a cable having a fixed end permanently attached to said helmet, and having a retractable end capable of being secured by said lock while said cable resides within said groove; and a plurality of pegs on said helmet for retaining said cable within said groove.

3. The locking safety helmet of claim 2 wherein said pegs are located above said groove.

4. The locking safety helmet of claim 3 wherein said pegs comprise extrusions on said helmet.

5. A locking safety helmet comprising:

a lock partially embedded into said helmet;

a brim having a shallow groove formed therein; and a cable having a fixed end permanently attached to said helmet, and having a retractable end capable of being secured by said lock while said cable resides within said groove, and wherein said fixed end of said cable is permanently attached to said helmet through attachment to said lock.

6. The locking safety helmet of claim 5 wherein, when said retractable end of said cable is secured by said lock, said cable is retained tautly within said groove by tension.

* * * * *